(12) United States Patent
Jung et al.

(10) Patent No.: US 10,107,348 B2
(45) Date of Patent: Oct. 23, 2018

(54) DAMPING FORCE VARIABLE VALVE ASSEMBLY AND DAMPING FORCE VARIABLE SHOCK ABSORBER INCLUDING THE SAME

(71) Applicant: MANDO CORPORATION, Pyeongtaek-si, Gyeonggi-do (KR)

(72) Inventors: Ki Don Jung, Seongnam-si (KR); Myeong Su Hwang, Suwon-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/415,819

(22) Filed: Jan. 25, 2017

(65) Prior Publication Data

US 2017/0211651 A1    Jul. 27, 2017

(30) Foreign Application Priority Data

Jan. 27, 2016 (KR) .......................... 10-2016-0010096

(51) Int. Cl.
*F16F 9/34* (2006.01)
*F16F 9/46* (2006.01)

(52) U.S. Cl.
CPC ................ *F16F 9/34* (2013.01); *F16F 9/466* (2013.01); *F16F 2222/12* (2013.01); *F16F 2230/24* (2013.01)

(58) Field of Classification Search
CPC .... F16F 9/34; F16F 9/466; F16F 9/348; F16F 9/325; F16F 2222/12; F16F 2230/24
(Continued)

(56) References Cited

U.S. PATENT DOCUMENTS 5,934,421 A * 8/1999 Nakadate ................ F16F 9/325
188/299.1
5,975,258 A * 11/1999 Nezu ....................... F16F 9/348
188/266.5
(Continued)

FOREIGN PATENT DOCUMENTS

JP    2002-013582 A    1/2002
JP       4478848 B2    3/2010
(Continued)

OTHER PUBLICATIONS

Chinese Office Action dated Jul. 2, 2018, issued in corresponding Chinese Patent Application No. 201710063060.1, citing the above reference.

*Primary Examiner* — Thomas W Irvin
(74) *Attorney, Agent, or Firm* — Hauptman Ham, LLP

(57) ABSTRACT

The present disclosure relates to a damping force variable valve assembly, which is installed in a damping force variable shock absorber for adjustment of a damping force of the shock absorber, includes at least: a solenoid that generates a magnetic force when an electric current is supplied thereto; a plunger configured to be moved by the magnetic force of the solenoid; a spool that is moved together with the plunger and change a damping force between a hard mode and a soft mode by changing an inner passage of the damping force variable valve assembly; and a spool position determination member that locates the spool at a fail position, which does not correspond to the hard mode and the soft mode, so as to maintain the damping force of the shock absorber at a medium level between the hard mode and the soft mode upon fail of the solenoid.

6 Claims, 3 Drawing Sheets

(58) Field of Classification Search
USPC .............................. 188/266.8, 322.2, 282.4
See application file for complete search history.

(56) References Cited

U.S. PATENT DOCUMENTS

| | | | | |
|---|---|---|---|---|
| 6,119,829 | A * | 9/2000 | Nakadate | F16F 9/348 |
| | | | | 188/266.6 |
| 7,407,044 | B2 * | 8/2008 | Jee | F16F 9/465 |
| | | | | 188/266.6 |
| 7,604,101 | B2 * | 10/2009 | Park | F16F 9/465 |
| | | | | 188/315 |
| 7,770,983 | B2 * | 8/2010 | Park | F16F 9/465 |
| | | | | 188/266 |
| 8,220,604 | B2 * | 7/2012 | Jee | F16F 9/325 |
| | | | | 137/565.35 |
| 9,150,077 | B2 * | 10/2015 | Roessle | F16F 9/348 |
| 9,506,520 | B2 * | 11/2016 | Kim | F16F 9/34 |
| 9,759,284 | B2 * | 9/2017 | Hagidaira | F16F 9/34 |
| 2005/0167216 | A1 * | 8/2005 | Park | F16F 9/46 |
| | | | | 188/282.3 |
| 2008/0185246 | A1 * | 8/2008 | Park | F16F 9/3485 |
| | | | | 188/322.15 |
| 2016/0288869 | A1 * | 10/2016 | Miwa | B62K 25/283 |
| 2016/0319897 | A1 * | 11/2016 | Mochizuki | F16F 9/096 |

FOREIGN PATENT DOCUMENTS

| | | |
|---|---|---|
| KR | 10-0842031 B1 | 6/2008 |
| KR | 10-1187039 B1 | 9/2012 |
| KR | 10-2014-0115727 A | 10/2014 |
| KR | 10-1457660 B1 | 11/2014 |

* cited by examiner

DAMPING FORCE VARIABLE VALVE ASSEMBLY AND DAMPING FORCE VARIABLE SHOCK ABSORBER INCLUDING THE SAME

CROSS-REFERENCE(S) TO RELATED APPLICATION

This application claims the benefit of Korean Patent Application No. 10-2016-0010096, filed on Jan. 27, 2016, in the Korean Intellectual Property Office, the disclosure of which is incorporated herein in its entirety by reference.

BACKGROUND OF THE INVENTION

Field of the Invention

The present invention relates to a damping force variable valve assembly installed in a damping force variable shock absorber, and a damping force variable shock absorber including the same, and more particularly, to a damping force variable valve assembly that maintains a damping force at a medium level by maintaining a position of a spool at a fail position upon fail of a solenoid installed in a damping force variable valve, thereby providing satisfactory steering performance and ride comfort, and a damping force variable shock absorber including the damping force variable valve assembly.

Description of the Related Art

In general, a shock absorber is installed in means of transportation, such as automobile or the like, and improves ride comfort by absorbing and damping a vibration or shock from a road surface during driving, or improves ride comfort by maintaining a posture of a vehicle body so as to be resistant to a force such as an inertial force applied to the vehicle body during driving.

Such a shock absorber includes a cylinder and a piston rod installed to be compressible and extendable within the cylinder. The cylinder and the piston rod are connected to a vehicle body, wheels, or axles.

A shock absorber, a damping force of which is set to be low, can improve ride comfort by absorbing a vibration caused by unevenness of a road surface during driving. On the contrary, a shock absorber, a damping force of which is set to be high, can improve steering stability by suppressing a change in a posture of a vehicle body. Therefore, in a conventional vehicle, a shock absorber, to which damping force characteristics are differently set according to the purpose of use of the vehicle, is selected.

Meanwhile, a damping force variable shock absorber has been recently developed, which is equipped with a damping force variable valve at one side thereof so as to appropriately adjust damping force characteristics thereof for the purpose of improving ride comfort or steering stability according to a road surface, a driving condition, and the like.

FIG. 1 is a sectional view illustrating an example of a damping force variable shock absorber according to the related art. Referring to FIG. 1, the damping force variable shock absorber 10 according to the related art includes a base shell 12, and an inner tube 14 which is installed inside the base shell 12 and in which a piston rod 24 is movably installed in a length direction. A rod guide 26 and a body valve 27 are installed in an upper portion and a lower portion of the inner tube 14 and the base shell 12, respectively. In the inside of the inner tube 14, a piston valve 25 is connected to one end of the piston rod 24, and the piston valve 25 partitions the inner space of the inner tube 14 into a rebound chamber 20 and a compression chamber 22. A top cap 28 and a base cap 29 are installed in an upper portion and a lower portion of the base shell 12, respectively.

A reservoir chamber 30 is formed between the inner tube 14 and the base shell 12 to compensate for a change in the volume of the inner tube 14 according to the reciprocating motion of the piston rod 24. A flow of a working fluid between the reservoir chamber 30 and the compression chamber 22 is controlled by the body valve 27.

In addition, a separator tube 16 is installed inside the base shell 12. The inside of the base shell 12 is partitioned by the separator tube 16 into a high-pressure chamber PH connected to the rebound chamber 20, and a low-pressure chamber PL serving as the reservoir chamber 30.

The high-pressure chamber PH is connected to the rebound chamber 20 through an inner hole 14a of the inner tube 14. The low-pressure chamber PL is connected to the compression chamber 22 through a lower passage 32 formed between a body of the body valve 27 and the base shell 12 (or the base cap 29) and a passage formed in the body valve 27.

Meanwhile, the shock absorber 10 according to the related art includes a damping force variable valve assembly 40 mounted on one side of the base shell 12 so as to vary a damping force.

The damping force variable valve assembly 40 is provided with passages respectively connected to the base shell 12 and the separator tube 16 and communicating with the high-pressure chamber PH and the low-pressure chamber PL. In addition, the damping force variable valve assembly 40 includes a spool 44 installed to be moved by a driving of a plunger 42. An inner passage communicating with the high-pressure chamber PH and the low-pressure chamber PL is varied by the movement of the spool 44, and the damping force of the shock absorber is varied accordingly. The plunger 42 is configured to move in a left-right direction, when viewed in FIG. 1, due to a magnetic force generated when an electric current flows through a solenoid.

In the damping force variable valve assembly according to the related art, for example, when the plunger 42 moves left, the spool 44 closes the passage to generate a high damping force (hard mode). On the contrary, when the plunger 42 moves right, the spool 44 opens the passage to generate a low damping force (soft mode).

However, in the damping force variable shock absorber according to the related art, if the supply of the electric current to the solenoid is stopped (that is, failed) due to an accident such as a disconnection of a power line or the like, the spool and the plunger are positioned such that the damping force variable valve assembly implements only one of the soft mode and the hard mode. Due to this, the damping force variable shock absorber according to the related art is subjected to deterioration in the steering performance and the behavior stability of the vehicle causing safety problems, or to an unpleasant ride comfort due to an excessive damping force.

PRIOR ART DOCUMENT(S)

Patent Document

Korean Patent Registration No. 10-0842031 (Jun. 23, 2008)
Japanese Patent No. 4478848 (Mar. 26, 2010)
Korean Patent Registration No. 10-1187039 (Sep. 24, 2012.)
Korean Patent Application Publication No. 10-2014-0115727 (Oct. 1, 2014)

Korean Patent Registration No. 10-1457660 (Oct. 28, 2014)

SUMMARY OF THE INVENTION

The present invention has been made in an effort to solve the above problems and is directed to provide a damping force variable valve assembly that maintains a damping force at a medium level by maintaining a position of a plunger, which is operated by a solenoid, at a fail position without inclination toward a hard mode or a soft mode, upon fail of the solenoid installed in a damping force variable valve, thereby providing satisfactory steering performance and ride comfort, and a damping force variable shock absorber including the damping force variable valve assembly.

According to one aspect of the present invention, there is provided a damping force variable valve assembly, which is installed in a damping force variable shock absorber for adjustment of a damping force of the shock absorber, the damping force variable valve assembly comprising: a solenoid configured to generate a magnetic force when an electric current is supplied thereto; a plunger configured to be moved by the magnetic force of the solenoid; a spool configured to be moved together with the plunger and change a damping force between a hard mode and a soft mode by changing an inner passage of the damping force variable valve assembly; and a spool position determination member configure to locate the spool at a fail position, which does not correspond to the hard mode and the soft mode, so as to maintain the damping force of the shock absorber at a medium level between the hard mode and the soft mode upon fail of the solenoid.

The damping force variable valve assembly can further comprise a communication member configured to communicate a main passage with a pilot passage of the inner passage when the spool is at the fail position.

The damping force variable valve assembly can further comprise a spool guide having a through-hole, at which the spool is disposed, wherein the spool guide has a first hole constituting a part of a soft passage, a second hole constituting a part of the main passage, and a third hole constituting a part of the pilot passage, a second protrusion for opening and closing the second hole according to the movement of the spool is formed on an outer peripheral surface of the spool, and the communication member is a groove formed in the second protrusion so as to communicate the second hole with the pilot passage through the through-hole when the spool is at the fail position.

A first protrusion can be formed on the outer peripheral surface of the spool, and when the spool is at the fail position, the first protrusion closes a part of the first hole.

The damping force variable valve assembly can further comprise: a spool guide having a through-hole, at which the spool is disposed; a plug fixed to one end of the spool guide opposite to a position at which the solenoid is disposed; and a spool pressing spring disposed between the plug and the one end of the spool to press the spool toward the solenoid, wherein the spool position determination member is a spool position determination spring that is disposed between the plug and the one end of the spool and has a smaller spring constant and a longer length than those of the spool pressing spring.

The damping force variable valve assembly can further comprise: a spool guide having a through-hole, at which the spool is disposed; a plug fixed to one end of the spool guide opposite to a position at which the solenoid is disposed; and a pressing spring disposed between the plug and the one end of the spool to press the spool toward the solenoid, wherein the spool position determination member is constituted by the pressing spring, and the pressing spring is divided into two sections having different spring constants.

Another aspect of the present invention provides a damping force variable shock absorber including any one of the damping force variable valve assemblies described above.

DETAILED DESCRIPTION OF EMBODIMENTS

Figure 1:
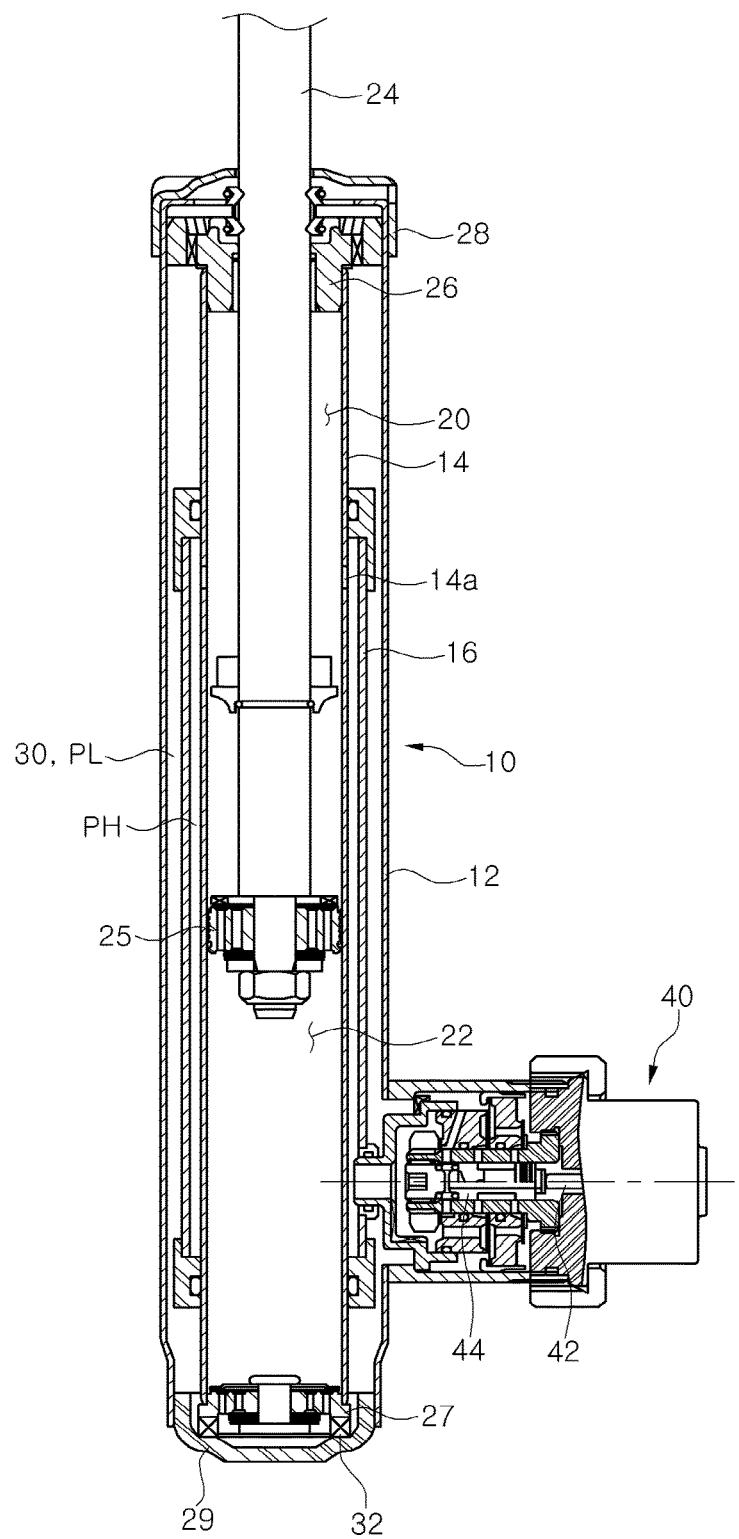
FIG. 1 is a sectional view illustrating an example of a damping force variable shock absorber according to the related art.

Hereinafter, a damping force variable valve assembly of a damping force variable shock absorber according to an embodiment of the present invention will be described in detail with reference to the accompanying drawings. For convenience, in the following description given with reference to FIGS. 2 and 3, the same reference numerals as those of FIG. 1 are used to refer to the same elements.

Figure 2:
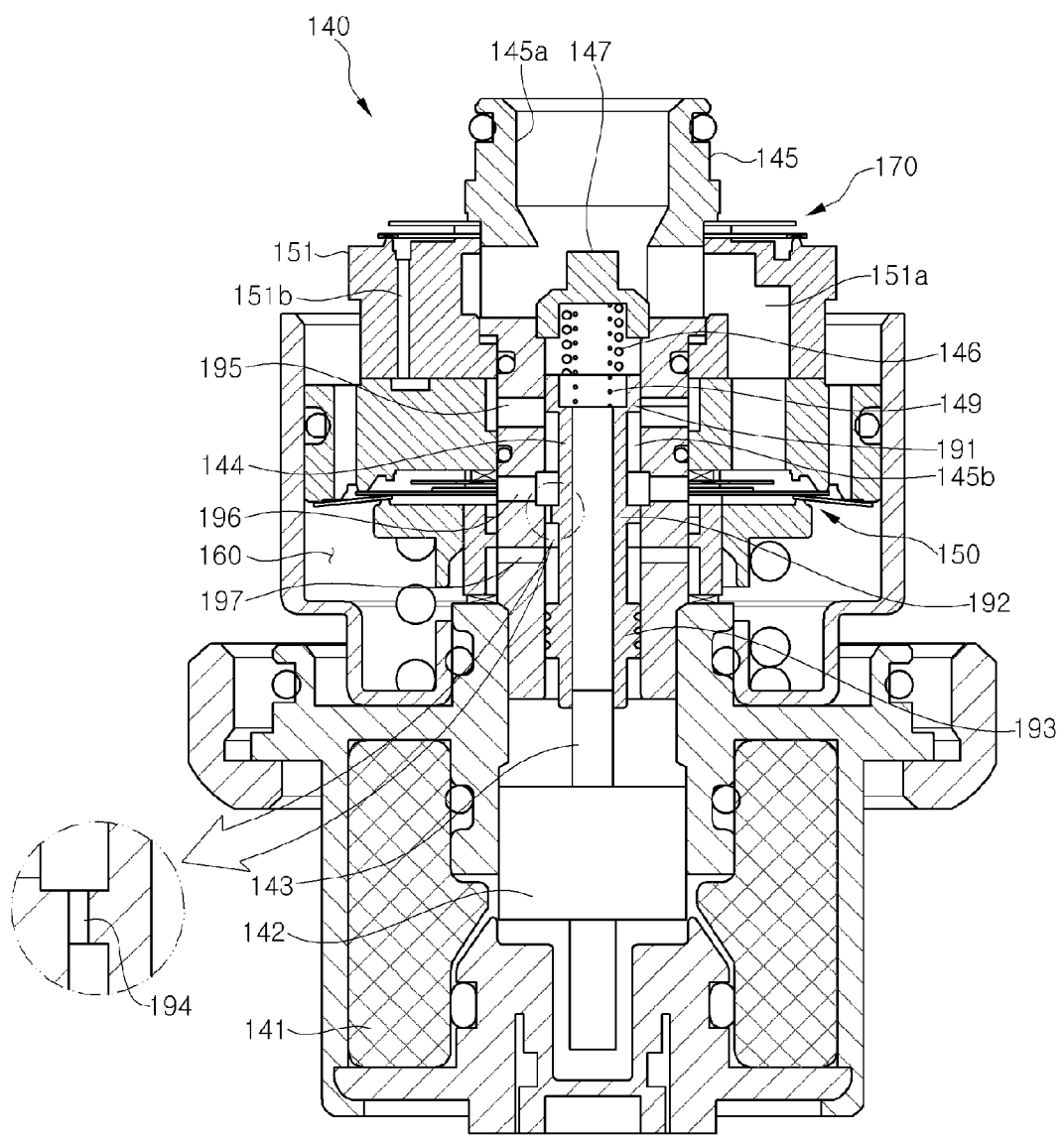
FIG. 2 is a cross-sectional view of a damping force variable valve assembly mounted on a damping force variable shock absorber having a fail-safe function, according to one embodiment of the present invention.
Figure 3:
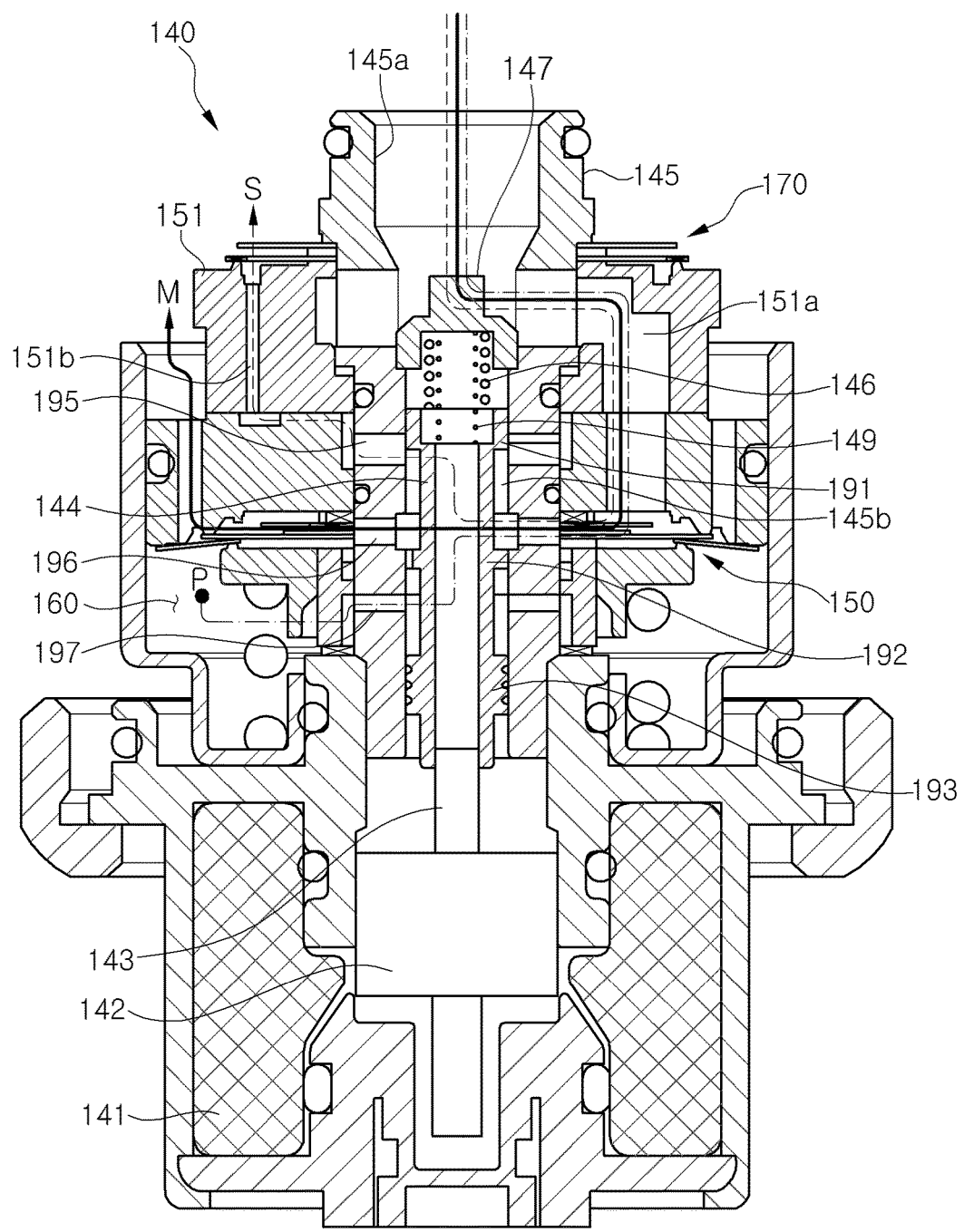
FIG. 3 is a cross-sectional view illustrating an inner passage of the damping force variable shock absorber having the fail-safe function, according to the embodiment of the present invention.

As illustrated in FIGS. 2 and 3, the damping force variable shock absorber according to an embodiment of the present invention includes a spool position determination member 149 and a communication member 194 communicating a main passage M with a pilot passage P, so as to maintain a damping force at a medium level by locating a spool 144 at a medium position without inclination toward a hard mode or a soft mode, upon fail of a solenoid installed in a damping force variable valve assembly 140.

The damping force variable valve assembly 140 is provided with oil passages respectively connected to a base shell 12 and a separator tube 16 of a damping force variable shock absorber (10; see FIG. 1) and communicating with a high-pressure chamber PH and a low-pressure chamber PL. Since the configuration in which the damping force variable valve assembly 140 is connected to the base shell 12 and the separator tube 16 of the shock absorber and communicates with the high pressure-chamber PH and the low-pressure chamber PL is similar to that of the related art illustrated in FIG. 1, it is not illustrated in FIG. 2.

In the damping force variable valve assembly 140, the spool 144 is installed in a through-hole 145b of a spool guide 145 to contact a shaft 143 of a plunger 142, such that the spool 144 is moved by the driving of the plunger 142. Further, an inner passage of the damping force variable valve assembly 140 communicating with the high-pressure chamber PH and the low-pressure chamber PL is changed by the movement of the spool 144, and a damping force of the shock absorber is changed accordingly.

A plug 147 is fixed to one end of the spool guide 145 opposite to a position at which the solenoid 141 for driving the plunger 142 in response to a supply of an electric current is disposed. The spool position determination member 149 is disposed between the plug 147 and one end of the spool 144. Upon fail of the solenoid 141, the a spool position determination member 149 serves to move and maintain the spool 144 to a fail position (see FIG. 2) to be described below. That is, when the solenoid 141 is failed, an action of a force of the plunger 142 to the spool 144 by a magnetic force is not generated, and the spool position determination member 149 can move and maintain the spool 144 to the fail position. Also, the damping force variable valve assembly 140 according to one embodiment of the present invention may not use a spring for pressing the plunger 142 toward the spool 144. In this case, the spool position determination member 149 may be more smoothly operated.

When the spool 144 is at the fail position, the spool 144 is located at the through-hole 145b of the spool guide 145 of the spool 144, such that a first protrusion 191 formed on the outer peripheral surface of the spool 144 closes a part of a first hole 195 formed in the spool guide 145, which constitutes a part of a soft passage (S; see FIG. 3), and a second protrusion 192 formed on the outer peripheral surface of the spool 144 opens a whole or a part of a second hole 196 formed in the spool guide 145, which constitutes a part of a main passage M, allowing it to communicate with the first hole 195 by the through-hole 145b of the spool guide 145.

Also, at this time, the communication member, for example, a groove 194 formed on the outer peripheral surface of the second protrusion 192, communicates with the second hole 196 so that the main passage M communicates with the pilot passage P passing through a third hole 197 formed in the spool guide 145.

As described above, when the spool 144 is located at the fail position, a part of a fluid flowing along the main passage M is divided therefrom and flows along the soft passage S, and another part of the fluid flowing along the main passage M is also divided therefrom and flows along the pilot passage P, thus preventing the damping force of the shock absorber from being inclined toward or becoming a maximum soft mode or a maximum hard mode. Therefore, the shock absorber according to an embodiment of the present invention can generate the damping force that satisfies both the steering performance and the ride comfort even when the fail occurs.

A third protrusion 193 formed on the outer peripheral surface of the spool 144 slides along and on the inner surface of the spool guide 145 to suppress the shaking of the spool 144.

The spool position determination member 149 may be provided with, for example, a spring disposed between the plug 147 and the one end of the spool 144. That is, for example, excluding a spool pressing spring 146 for pressing the spool 144 to the shaft 143 of the plunger 142 when the solenoid 141 is normally operated, the spool position determination member 149 may be constituted by a spool position determination spring 149 that has a smaller spring constant and a longer length than those of the spool pressing spring 146 and thus can locate the spool 144 at the fail position when the fail occurs. In this case, both ends of the spool position determination spring 149 may be respectively fixedly connected to the plug 147 and one end of the spool 144.

Also, for example, the spool position determination member 149 may be configured by one spring having two or more sections with different spring constants. That is, the section having a greater spring constant can mainly press the spool 144 to the plunger 142 during a normal operation of the solenoid 141, and the section having a smaller spring constant can move the spool 144 toward the fail position and maintain it thereat upon the fail of the solenoid 141.

The damping force variable valve assembly 140 includes a main valve 150 and a pilot chamber 160 used for changing the damping force of the shock absorber. The pilot chamber 160 is provided to have a pilot pressure that presses the main valve 150 from the back of the main valve 150.

The main valve 150 is installed to block the main passage 151a formed in a valve body 151 from the back of the valve body 151. On the other hand, the valve body 151 may be connected to the high-pressure chamber PH of the above-described shock absorber 10 through the spool guide 145 installed therein. Therefore, a high-pressure fluid introduced from the high-pressure chamber PH through an inlet port 145a inside the spool guide 145 passes through the main passage 151a and flows toward the main valve 150. The valve body 151 may be formed with one component, or may be formed with an assembly of a plurality of components.

The pressure inside the pilot chamber 160 may be changed according to the operation of the solenoid 141 (that is, the movement of the spool 144 caused by the operation of the solenoid 141). The change in the pressure inside the pilot chamber 160, that is, a change in the pilot pressure with respect to the main valve 150, causes the main valve 150 to vary a force against the fluid passing through the main passage 151a, thereby providing a variable damping force to the shock absorber.

As the plunger 142 and the spool 144 are moved by the operation of the solenoid 141, each passage area is adjusted by the interaction between the protrusions 191 and 192 of the spool 144 and the holes 195, 196, and 197 of the spool guide 145. Therefore, the opening/closing and/or the opening degree of the pilot passage P extending from the upstream side of the main valve 150 to the pilot chamber 160 can be controlled.

A passage 151b formed in the body 151 and a disk valve 170 disposed at the exit thereof constitute a part of the soft passage S formed inside the damping force variable valve assembly 140.

As described above, in the damping force variable valve assembly 140 according to the embodiment of the present invention, the spool position determination member 149 moves and maintains the position of the spool 144 to the fail position upon the fail of the solenoid 141, so that a part of the fluid flowing through the main passage M is divided therefrom and flows through the soft passage S, and another part of the fluid flowing through the main passage M is divided therefrom and flows to the pilot passage P through the communication member 194. Therefore, even when the solenoid 141 is failed, the damping force of the damping force variable valve assembly can provide the damping force of the medium level without occurrence of the hard mode or the soft mode, thereby improving steering performance and ride comfort of the vehicle.

While the embodiments of the present invention have been described with reference to the specific embodiments, it will be apparent to those skilled in the art that various changes and modifications may be made without departing from the spirit and scope of the invention as defined in the following claims.

| DESCRIPTION OF REFERENCE NUMERALS | |
|---|---|
| 140: damping force variable valve assembly | 141: solenoid |
| 142: plunger | 144: spool |
| 145: spool guide | 145a: Inlet port |
| 146: spool pressing spring | 147: plug |
| 149: spool position determination spring | 150: main valve |

-continued

DESCRIPTION OF REFERENCE NUMERALS

| | |
|---|---|
| 151: valve body | 151a: main passage |
| 160: pilot chamber | 170: valve |
| 191-193: protrusions | |
| 195-197: holes formed in spool guide | |

What is claimed is:

1. A damping force variable valve assembly, which is installed in a damping force variable shock absorber for adjustment of a damping force of the shock absorber, the damping force variable valve assembly comprising:
   a solenoid configured to generate a magnetic force when an electric current is supplied thereto;
   a plunger configured to be moved by the magnetic force of the solenoid;
   a spool configured to be moved together with the plunger and change a damping force between a hard mode and a soft mode by changing an inner passage of the damping force variable valve assembly; and
   a spool position determination member configure to locate the spool at a fail position, which does not correspond to the hard mode and the soft mode, so as to maintain the damping force of the shock absorber at a medium level between the hard mode and the soft mode upon fail of the solenoid,
   wherein the damping force variable valve assembly further comprises:
   a spool guide having a through-hole, at which the spool is disposed;
   a plug fixed to one end of the spool guide opposite to a position at which the solenoid is disposed; and
   a spool pressing spring disposed between the plug and the one end of the spool to press the spool toward the solenoid,
   wherein the spool position determination member is a spool position determination spring that is disposed between the plug and the one end of the spool and has a smaller spring constant and a longer length than those of the spool pressing spring.

2. The damping force variable valve assembly according to claim 1, further comprising a communication member configured to communicate a main passage of the inner passage with a pilot passage of the inner passage when the spool is at the fail position.

3. The damping force variable valve assembly according to claim 2, further comprising a spool guide having a through-hole, at which the spool is disposed,
   wherein the spool guide has a first hole constituting a part of a soft passage, a second hole constituting a part of the main passage, and a third hole constituting a part of the pilot passage,
   a second protrusion for opening and closing the second hole according to the movement of the spool is formed on an outer peripheral surface of the spool, and
   the communication member is a groove formed in the second protrusion so as to communicate the second hole with the pilot passage through the through-hole when the spool is at the fail position.

4. The damping force variable valve assembly according to claim 3, wherein
   a first protrusion is formed on the outer peripheral surface of the spool, and
   when the spool is at the fail position, the first protrusion closes a part of the first hole.

5. A damping force variable valve assembly, which is installed in a damping force variable shock absorber for adjustment of a damping force of the shock absorber, the damping force variable valve assembly comprising:
   a solenoid configured to generate a magnetic force when an electric current is supplied thereto;
   a plunger configured to be moved by the magnetic force of the solenoid;
   a spool configured to be moved together with the plunger and change a damping force between a hard mode and a soft mode by changing an inner passage of the damping force variable valve assembly; and
   a spool position determination member configure to locate the spool at a fail position, which does not correspond to the hard mode and the soft mode, so as to maintain the damping force of the shock absorber at a medium level between the hard mode and the soft mode upon fail of the solenoid,
   wherein the damping force variable valve assembly further comprises:
   a spool guide having a through-hole, at which the spool is disposed;
   a plug fixed to one end of the spool guide opposite to a position at which the solenoid is disposed; and
   a pressing spring disposed between the plug and the one end of the spool to press the spool toward the solenoid,
   wherein the spool position determination member is constituted by the pressing spring, and the pressing spring is divided into two sections having different spring constants.

6. A damping force variable shock absorber comprising a damping force variable valve assembly,
   wherein the damping force variable valve assembly is installed in a damping force variable shock absorber for adjustment of a damping force of the shock absorber, and
   wherein the damping force variable valve assembly comprises:
   a solenoid configured to generate a magnetic force when an electric current is supplied thereto;
   a plunger configured to be moved by the magnetic force of the solenoid;
   a spool configured to be moved together with the plunger and change a damping force between a hard mode and a soft mode by changing an inner passage of the damping force variable valve assembly; and
   a spool position determination member configure to locate the spool at a fail position, which does not correspond to the hard mode and the soft mode, so as to maintain the damping force of the shock absorber at a medium level between the hard mode and the soft mode upon fail of the solenoid,
   wherein the damping force variable valve assembly further comprises:
   a spool guide having a through-hole, at which the spool is disposed;
   a plug fixed to one end of the spool guide opposite to a position at which the solenoid is disposed; and
   a spool pressing spring disposed between the plug and the one end of the spool to press the spool toward the solenoid,
   wherein the spool position determination member is a spool position determination spring that is disposed between the plug and the one end of the spool and has a smaller spring constant and a longer length than those of the spool pressing spring.

* * * * *